US009823763B2

(12) United States Patent
Park et al.

(10) Patent No.: US 9,823,763 B2
(45) Date of Patent: *Nov. 21, 2017

(54) TOUCH PANEL (71) Applicant: LG CHEM, LTD., Seoul (KR)

(72) Inventors: Min Soo Park, Daejeon (KR); Se Woo Yang, Daejeon (KR); Suk Ky Chang, Daejeon (KR); Seung Min Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 65 days.

This patent is subject to a terminal disclaimer.

(21) Appl. No.: 14/158,544

(22) Filed: Jan. 17, 2014

(65) Prior Publication Data
US 2014/0134434 A1  May 15, 2014

Related U.S. Application Data (63) Continuation of application No. PCT/KR2012/005786, filed on Jul. 19, 2012.

(30) Foreign Application Priority Data

Jul. 19, 2011 (KR) .................... 10-2011-0071454
Jul. 19, 2012 (KR) .................... 10-2012-0078768

(51) Int. Cl.
| B32B 7/12 | (2006.01) |
| G06F 3/041 | (2006.01) |
| C09J 133/08 | (2006.01) |
| C09J 7/02 | (2006.01) |
| C08F 220/10 | (2006.01) |
| C09J 4/00 | (2006.01) |
| C09J 133/14 | (2006.01) |
| C08K 5/37 | (2006.01) |

(52) U.S. Cl.
CPC .......... *G06F 3/0412* (2013.01); *C08F 220/10* (2013.01); *C09J 4/00* (2013.01); *C09J 7/0217* (2013.01); *C09J 133/08* (2013.01); *C09J 133/14* (2013.01); *G06F 3/041* (2013.01); *C08K 5/37* (2013.01); *Y10T 428/2891* (2015.01)

(58) Field of Classification Search
None
See application file for complete search history.

(56) References Cited

U.S. PATENT DOCUMENTS 6,559,902 B1 * 5/2003 Kusuda .................. G06F 3/045
                                                                  349/12
2006/0167181 A1  7/2006 Husemann et al.
2008/0033095 A1  2/2008 Takahashi et al.
2009/0087629 A1 * 4/2009 Everaerts .................. B32B 7/12
                                                                  428/203
2010/0167050 A1 * 7/2010 Husemann ............... C08F 20/12
                                                                  428/355 AC
2012/0244348 A1  9/2012 Park et al.
2013/0201145 A1 * 8/2013 Park ........................ C09J 133/14
                                                                  345/173
2013/0202884 A1 * 8/2013 Park ..................... C09J 133/066
                                                                  428/354
2014/0138131 A1 * 5/2014 Hao ........................ G06F 3/044
                                                                  174/257

FOREIGN PATENT DOCUMENTS

| CN | 1454367 A | 11/2003 |
| CN | 1667068 A | 9/2005 |
| EP | 1574557 A1 | 9/2005 |
| EP | 2484737 A2 | 8/2012 |
| EP | 2631279 A2 | 8/2013 |
| JP | 2003138237 A | 5/2003 |
| JP | 2005-255877 A | 9/2005 |
| JP | 2008-037959 A | 2/2008 |
| JP | 2010-195942 A | 9/2010 |

(Continued)

OTHER PUBLICATIONS

Product data sheet "1-Dodecanethiol" from Sigma-Aldrich, retrived Oct. 26, 2015.*
Ryu, Takeatsu, et al., "Optical Film With Pressure Sensitive Adhesive Agent and Optical Laminate", English translation of JP 2008-176173A.*

*Primary Examiner* — Anish Desai
(74) *Attorney, Agent, or Firm* — Dentons US LLP (57) ABSTRACT

Provided is a touch panel. The touch panel includes a base and a pressure-sensitive adhesive layer attached to the base and having a peel strength with respect to a polycarbonate sheet of 1,900 g/25 mm or more. The pressure-sensitive adhesive layer includes an acryl polymer compound containing an acryl polymer and a thiol polymer derived by binding a thiol compound into a chain, or a side chain or terminal end of a chain of the acryl polymer. Accordingly, penetration of oxygen, moisture or other impurities at an interface between the base film and the pressure-sensitive adhesive layer, or at an interface between a conductor thin film and a pressure-sensitive adhesive layer may be effectively inhibited, and degradation in optical properties such as visibility due to bubbles generated at a pressure-sensitive adhesive interface may be prevented. In addition, when the pressure-sensitive adhesive layer is directly attached to the conductor thin film and even exposed to severe conditions such as high temperature or high temperature and high humidity, the change in the resistance of the conductor thin film may be effectively inhibited, and thus the touch panel may be stably driven for a long time.

5 Claims, 2 Drawing Sheets

(56) References Cited

FOREIGN PATENT DOCUMENTS

| | | | |
|---|---|---|---|
| JP | 2010-260992 | A | 11/2010 |
| JP | 2011-021179 | A | 2/2011 |
| JP | 2011-132354 | A | 7/2011 |
| KR | 10-2000-0005235 | | 1/2000 |
| KR | 10-2008-0024258 | | 3/2008 |
| KR | 10-2011-0034556 | | 4/2011 |
| KR | 20110034556 | A | 4/2011 |
| KR | 10-2011-0069277 | | 6/2011 |
| WO | 2010/014545 | A1 | 2/2010 |
| WO | 2011/037440 | A2 | 3/2011 |

\* cited by examiner

TOUCH PANEL

This application is a Continuation Bypass of International Application PCT/KR2012/005786, with an international filing date of Jul. 19, 2012, which claims priority to and the benefit of Korean Patent Application No. 10-2011-0071454, filed Jul. 19, 2011 and Korean Patent Application No. 10-2012-0078768, filed Jul. 19, 2012, the disclosure of which are incorporated herein by reference in their entirety.

BACKGROUND

1. Field of the Invention

The present invention relates to a touch panel, a pressure-sensitive adhesive composition for a touch panel, a double-sided pressure-sensitive adhesive tape using the same, and a method of preparing a pressure-sensitive adhesive composition for a touch panel.

2. Discussion of Related Art

A touch panel or a touch screen is applied to various data processing terminals such as a mobile communication terminal or ATM, or displays such as a TV or monitor. In addition, as the touch panel is increasingly applied to compact portable electronic devices, the demand for a more compact and lighter touch panel or screen is increasing.

To configure the touch panel or screen, a pressure-sensitive adhesive is used. Such a pressure-sensitive adhesive should maintain transparency under severe conditions such as a high temperature or a high temperature and high humidity, have high peel strength, and inhibit lift-off and peeling. In addition, it is required that the pressure-sensitive adhesive effectively inhibits bubble generation which becomes a more frequent problem when a plastic film is used as a base.

Moreover, according to the structure of a touch panel or touch screen, when a pressure-sensitive adhesive is directly adhered to a conductor thin film such as an indium tin oxide (ITO) thin film, the pressure-sensitive adhesive also needs to have a characteristic of inhibiting the change in the resistance of a conductor thin film to stably drive the panel even when being used for a long time.

SUMMARY OF THE INVENTION

The present invention is directed to providing a touch panel, a pressure-sensitive adhesive composition for a touch panel, a double-sided pressure-sensitive adhesive tape using the same and a method of preparing a pressure-sensitive adhesive composition for a touch panel.

In one aspect, a touch panel may include a base, and a pressure-sensitive adhesive layer attached to the base.

The pressure-sensitive adhesive layer may include an acryl polymer compound comprising an acryl polymer and a thiol polymer derived from an acryl monomer and a thiol compound.

Here, in the touch panel, the pressure-sensitive adhesive layer may have a peel strength with respect to a polycarbonate sheet of 1,900 g/25 mm or more.

In the specification, a touch panel and a touch screen refer to the same subject.

Hereinafter, the present invention will be described in detail.

The touch panel of the present invention may include a pressure-sensitive adhesive without limitation, and may include a structure of a general material. For example, the touch panel of the present invention may be a resistive type touch panel or an electrostatic-capacity type touch panel.

Figure 1:
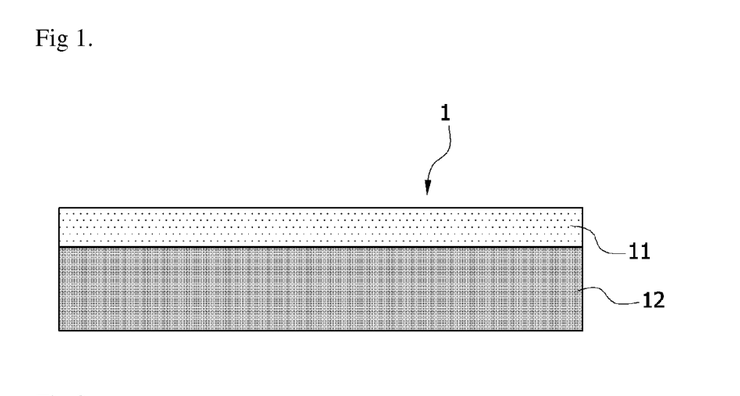
FIGS. 1 to 3 show a structure of a touch panel according to one exemplary embodiment of the present invention.

The basic structure of the touch panel according to the present invention is shown in FIG. 1.

The structure shown in FIG. 1 may include a base 12, and a pressure-sensitive adhesive layer 11 attached to one surface of the base 12. The base may be formed by a plastic film.

Figure 2:
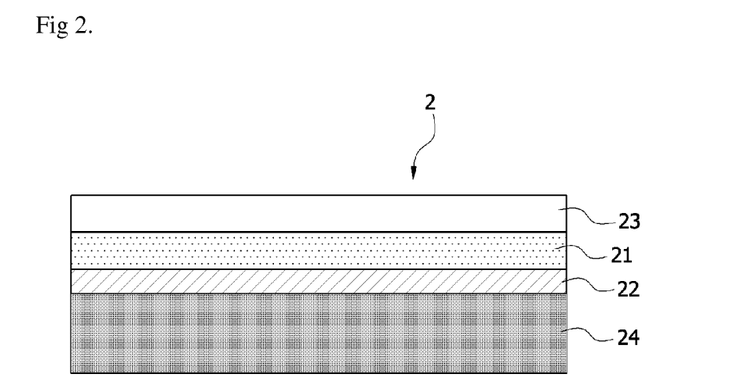

In one exemplary embodiment of the present invention, the touch panel, as shown in FIG. 2, may have a structure in which a plastic base film 24 having a conductor thin film 22 formed on one surface and a substrate 23 are attached by means of a pressure-sensitive adhesive layer 21.

Figure 3:
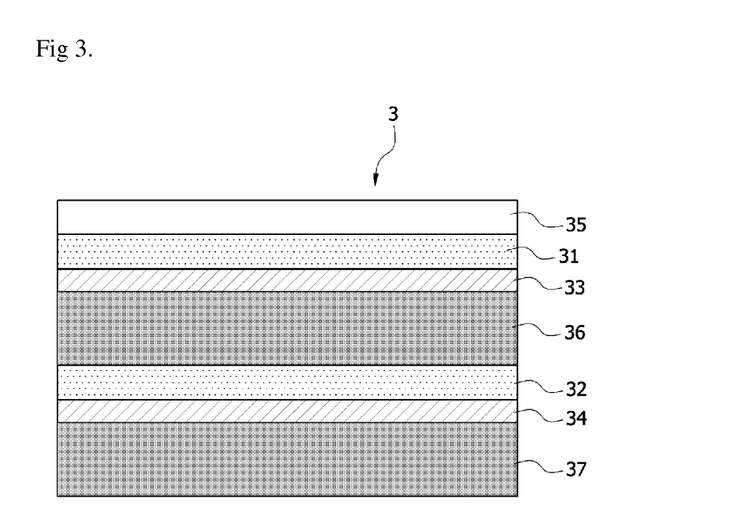

Meanwhile, in another exemplary embodiment of the present invention, the touch panel, as shown in FIG. 3, may be formed in a multi-layered structure having a multi-touch function, in which a plastic base film 36 having a conductor thin film 33 and a substrate 35 are attached by means of a pressure-sensitive adhesive layer 31, and the plastic base film 36 is attached to another plastic base film 37 having another conductor thin film 34 by means of a pressure-sensitive adhesive layer 32.

The kind of base included in the touch panel of the present invention (e.g., reference numerals 12 in FIG. 1, 24 in FIG. 2, or 36 or 37 in FIG. 3) is not particularly limited. In the present invention, any one of transparent films may be used as the base without limitation, and examples of the base may be a polyester film, an acryl resin film, a polycarbonate film, a polyamide film, a polyvinylchloride film, a polystyrene film, a polyolefin film such as a polyethylene or polypropylene film, and preferably, a polyester film such as a polyethyleneterephthalate film or a polycarbonate film.

In addition, the kind of substrate included in the touch panel of the present invention (e.g., reference numerals 23 in FIG. 2, or 35 in FIG. 3) is not particularly limited, and thus any one of the substrates having transparency, for example, glass or plastic, may be used without limitation.

In the present invention, the thickness of the base is not particularly limited, and may be suitably designed according to a place to which the base is applied. For example, the base may have a thickness of approximately 3 to 300 μm, preferably, approximately 5 to 250 μm, and more preferably, 10 to 200 μm.

In addition, the conductor thin film formed on the base or the substrate may be formed of a conventional thin film-forming method such as vacuum deposition, sputtering, ion plating, spray pyrolysis, chemical plating, electric plating, or a combination of at least two thereof, and preferably vacuum deposition or sputtering.

The conductor thin film may be formed of a metal such as gold, silver, platinum, palladium, copper, aluminum, nickel, chromium, titanium, iron, cobalt, tin or an alloy of at least two thereof, a metal oxide such as indium oxide, tin oxide, titanium oxide, cadmium oxide or a mixture of at least two thereof, or another metal oxide such as copper iodide. The conductor thin film may be a crystal or amorphous layer. In the present invention, the conductor thin film is preferably formed of indium tin oxide (ITO), but the present invention is not limited thereto. In addition, the thickness of the conductor thin film may be controlled to approximately 10 to 300 nm, and preferably approximately 10 to 200 nm, in consideration of the probability of forming a continuous coated layer, conductivity and transparency.

In the present invention, the conductor thin film may be formed on the plastic base film by means of an anchor layer or a dielectric layer. The anchor layer or dielectric layer may enhance a cohesive property between the conductor thin film and the base, and improve scratch resistance or elasticity. The anchor layer or dielectric layer may be formed of an inorganic material such as $SiO_2$, $MgF_2$ or $Al_2O_3$, an organic material such as an acryl resin, an urethane resin, a melamine resin, an alkyd resin or a siloxane-based polymer, or a mixture of at least two thereof by vacuum deposition, sputtering, ion plating or coating. The anchor layer or dielectric layer may be generally formed to have a thickness of approximately 100 nm or less, preferably, 15 to 100 nm, and more preferably 20 to 60 nm.

In the present invention, the base or substrate having the conductor thin film may be subjected to suitable adhering treatment such as corona discharging treatment, UV irradiation treatment, plasma treatment or sputter etching treatment.

The touch panel of the present invention includes the base and the pressure-sensitive adhesive layer attached to the conductor thin film formed on the base.

In the present invention, the pressure-sensitive adhesive layer may have a peel strength with respect to a polycarbonate sheet of 1,900 g/25 mm or more, preferably, 2,000 g/25 mm or more, and more preferably, 2,300 g/25 mm or more. When the peel strength is very low, durability and an effect of inhibiting bubble generation are degraded, and lift-off and peeling easily occur. The upper limit of the peel strength is not particularly limited.

In the present invention, the pressure-sensitive adhesive layer may have a resistance change ratio of ITO of 10% or less, and preferably 8% or less. When the resistance change ratio is higher than 10%, driving stability of the touch panel is degraded.

The resistance change ratio ($\Delta R$) may be expressed as Expression 1.

$$\Delta R=[(R-R_i)/R_i]\times 100 \quad \text{[Expression 1]}$$

In Expression 1, $\Delta R$ is a resistance change ratio, $R_i$ is an initial resistance of an ITO electrode measured after the pressure-sensitive adhesive layer is attached to the ITO electrode, and R is a resistance of the ITO electrode measured after the ITO electrode to which the pressure-sensitive adhesive layer is attached is maintained at 60° C. and a relative humidity of 90% for 240 hours. In the present invention, a specific method of measuring the resistance change ratio employs a method as will be described in the following exemplary embodiment. In addition, as the resistance change ratio decreases, the touch panel is more stably driven, and thus the lower limit of the resistance change ratio is not limited.

In the present invention, the pressure-sensitive adhesive layer includes an acryl polymer compound containing an acryl polymer and a thiol polymer.

In the present invention, the "acryl polymer compound" means compound containing an acryl polymer derived from an acryl monomer and a thiol polymer derived from an acryl monomer and a thiol compound.

In the present invention, the acryl polymer compound may have a weight average molecular weight of 200,000 to 2,500,000, preferably 300,000 to 2,000,000, and more preferably, 400,000 to 1,800,000. When the weight average molecular weight of the polymer compound is excessively low, durability may be degraded, and when the weight average molecular weight of the polymer compound is excessively high, workability such as coatability may be degraded, or an ability of preventing bending may be degraded. Therefore, the weight average molecular weight of the polymer compound is preferably controlled in the above-mentioned range.

In addition, in the present invention, the acryl polymer compound may have a polydispersity index (PDI) of 4.0 or more, and preferably 5.0 or more. In the present invention, the polydispersity index is a value ($M_w/M_n$) obtained by dividing a weight average molecular weight ($M_w$) by a number average molecular weight ($M_n$) of the polymer compound. The weight average molecular weight and the number average molecular weight may be measured by a known method such as gel permeation chromatography (GPC). In the present invention, a pressure-sensitive adhesive may have flowability, improved attachment strength, and thus improved adhesive strength by controlling the polydispersity index of the acryl polymer compound to 4.0 or more. Meanwhile, when the polydispersity index is less than 4.0, cohesive strength may be increased, but flowability may be degraded, and thus adhesive strength may be decreased.

In one exemplary embodiment of the present invention, the acryl polymer compound may include an acryl polymer which may include a (meth)acrylic acid ester monomer and a copolymerized monomer providing a crosslinkable functional group in a polymerized form.

The kind of (meth)acrylic acid ester monomer is not particularly limited, and thus alkyl(meth)acrylate may be used, or in consideration of physical properties such as cohesive strength, glass transition temperature and an adhesive property, alkyl(meth)acrylate having an alkyl group having 1 to 14 carbon atoms may be used. Examples of the alkyl(meth)acrylate may include methyl(meth)acrylate, ethyl(meth)acrylate, n-propyl(meth)acrylate, isopropyl(meth)acrylate, butyl(meth)acrylate, t-butyl(meth)acrylate, pentyl(meth)acrylate, 2-ethylhexyl(meth)acrylate, n-octyl(meth)acrylate, isooctyl(meth)acrylate, isononyl(meth)acrylate, rauryl(meth)acrylate and tetradecyl(meth)acrylate, and one or at least two thereof may be included in a resin.

A copolymerizable monomer providing a crosslinkable functional group may provide a crosslinkable functional group that may be reacted with a multifunctional crosslinking agent to the acryl polymer compound. Examples of the crosslinkable functional group may include a hydroxyl group, a carboxyl group, a nitrogen-containing group, an epoxy group or an isocyanate group, and preferably a hydroxyl group, a carboxyl group or a nitrogen-containing group. In the field of preparing an acryl polymer compound, various copolymerizable monomers capable of providing the crosslinkable functional group to an acryl polymer are known, and the monomer described above may be used without limitation. For example, a copolymerizable monomer having a hydroxyl group may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, a copolymerizable monomer having a carboxyl group may be (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride, and a copolymerizable monomer having a nitrogen-containing group may be (meth)acrylamide, N-vinyl pyrrolidone or N-vinyl caprolactam, but the present invention is not limited thereto.

In the present invention, the acryl polymer compound may include 90 to 99.9 parts by weight of a (meth)acrylic acid ester-based monomer, and 0.1 to 10 parts by weight of a copolymerizable monomer providing a crosslinkable functional group in a polymerization unit. In the present invention, the unit "parts by weight" refers to a weight ratio. The weight ratio between monomers may be controlled as described above, thereby effectively maintaining physical properties of the pressure-sensitive adhesive layer, for example, initial adhesive strength, durability and peel strength.

In the present invention, the acryl polymer compound may be prepared by a conventional polymerization method in the art, such as solution polymerization, photo polymerization, bulk polymerization, suspension polymerization or emulsion polymerization, and preferably solution polymerization.

In the present invention, the acryl polymer compound may include a thiol polymer derived from an acryl monomer and a thiol compound.

The thiol polymer is formed by inputting the thiol compound after a polymerization reaction of the (meth)acrylic acid ester monomer is initiated before the polymerization reaction is terminated, and the thiol compound is reacted with a remaining monomer to form a thiol polymer having a low molecular weight. As a result, decomposition of the conductor thin film is prevented when the conductor thin film is attached, and change in the resistance of the conductive film may be effectively prevented. Specifically, the thiol compound may be input from one minute after a polymerization reaction of a monomer mixture is initiated to 15 minutes before the polymerization reaction is terminated, or the thiol compound may be input from a time that a conversion rate of the monomer mixture is 5% to a time that a final conversion rate is 95%. In addition, a reaction terminating time herein is the time to reach a desired conversion rate. When the thiol compound is input at the same time as the polymerization reaction of the (meth) acrylic acid ester monomer is initiated, the thiol compound acts as a chain transfer agent, and thus it may be difficult to control the polydispersity index of the above-described acryl polymer compound to 4.0 or more. Therefore, as the thiol polymer is formed by inputting the thiol compound after the initiation of the polymerization reaction before the termination of the polymerization reaction, adhesive strength may be ensured by maintaining the polydispersity index in a predetermined level or more even though the thiol compound is added in the manufacture of the touch panel, and change in the resistance of the conductor thin film may be effectively prevented by the thiol polymer.

The thiol compound may be at least one of compounds represented by Formulas 1 to 4, but the present invention is not limited thereto.

[Formula 1]

[Formula 2]

[Formula 3]

[Formula 4]

In Formulas 1 to 4, $A^1$ to $A^3$ are independently linear or branched alkylene, $R^1$ is linear or branched alkyl, and $R^2$ is hydrogen, an alkyl group or $-A^4-C(-A^5-O-C(=O)-A^6-SH)_n R_{(3-n)}$. $A^4$ to $A^6$ are independently linear or branched alkylene, R is linear or branched alkyl, and n is an integer between 1 and 3.

In the thiol compounds of Formulas 1 to 4, $A^1$ is preferably linear or branched alkylene having 1 to 8 carbon atoms.

In the thiol compounds of Formulas 1 to 4, $R^1$ is preferably a linear or branched alkyl group having 3 to 20 carbon atoms.

In the thiol compounds of Formulas 1 to 4, $A^2$ is preferably linear or branched alkylene having 1 to 4 carbon atoms.

In the thiol compounds of Formulas 1 to 4, $A^3$ is preferably linear or branched alkylene having 1 to 4 carbon atoms, and $R^2$ is a linear or branched alkyl group having 4 to 12 carbon atoms or $-A^4-C(-A^5-O-C(=O)-A^6-SH)_n R_{(3-n)}$. Here, preferably, $A^4$ to $A^6$ are independently linear or branched alkylene having 1 to 4 carbon atoms, and n is preferably 2 or 3. Particularly, the alkyl or alkylene may be substituted with a substituent conventionally used in the art, and a suitable substituent may be a thiol group, a hydroxyl group, or a carboxyl group, and preferably a thiol group.

The thiol compound is the most preferable at least one selected from the group consisting of n-dodecanthiol, t-butyl mercaptan, n-butyl mercaptan, 1-octadecanthiol, trimethylol propane tris(3-mercaptothiol), pentaerythritol tetrakis(3-mercaptopropionate) and glycol dimercaptoacetate.

Meanwhile, in the present invention, when a cured product of a composition applied to the pressure-sensitive adhesive layer is composed of a thermosetting composition, the pressure-sensitive adhesive layer or composition may further include a multifunctional crosslinking agent. Such a crosslinking agent acts to improve cohesive strength of a resin cured product (pressure-sensitive adhesive) through a reaction with a polar functional group included in the acryl-based polymer, provide a crosslinking structure, and control a pressure-sensitive adhesive characteristic.

The kind of crosslinking agent that can be used in the present invention is not particularly limited, and may be an isocyanate compound, an epoxy compound, an aziridine compound, or a metal chelating compound, and one or at least two crosslinking agent may be suitably selected in consideration of the kind of crosslinkable functional group included in a resin. The isocyanate compound may be tolylene diisocyanate, xylene diisocyanate, diphenylmethane diisocyanate, hexamethylene diisocyanate, isoboron diisocyanate (isophorone diisocyanate), tetramethylxylene diisocyanate, naphthalene diisocyanate, or an addition-reaction product of at least one isocyanate compound thereof and a polyol. Here, the polyol may be trimethylolpropane. In addition, the epoxy compound may be one or at least two of ethyleneglycol diglycidylether, triglycidylether, trimethylolpropane triglycidylether, N,N,N',N'-tetraglycidyl ethylenediamine and glycerin diglycidylether, and the aziridine compound may be one or at least two of N,N'-toluene-2,4-bis (1-aziridine carboxamide), N,N'-diphenylmethane-4,4'-bis (1-aziridine carboxamide), triethylenemelamine, bisisoprothaloyl-1-(2-methylaziridine) and tri-1-aziridinyl phosphine oxide. Moreover, the metal chelate compound may be a compound in which a polyvalent metal is coordinated to acetyl acetone or ethyl acetoacetate, and the polyvalent metal may be aluminum, iron, zinc, tin, titanium, antimony, magnesium or vanadium.

In the pressure-sensitive adhesive layer of the present invention, the multifunctional crosslinking agent may include 0.01 to 5 parts by weight with respect to 100 parts by weight of an acryl-based resin, and within this range, durability and an adhesive property of the pressure-sensitive adhesive layer may be effectively controlled.

The pressure-sensitive adhesive layer of the present invention may further include one or at least two of a silane coupling agent, a tackifier, an epoxy resin, a UV stabilizer, an antioxidant, a coloring agent, a reinforcing agent, a filler, a foaming agent, a surfactant and a plasticizer, in addition to the above-described components.

In another aspect, a pressure-sensitive adhesive composition for a touch panel includes an acryl polymer compound including an acryl polymer and a thiol polymer derived from an acryl monomer and a thiol compound, and has a peel strength with respect to a polycarbonate sheet of 1,900 g/25 mm or more and a resistance change ratio of an ITO electrode of 10% or less when the composition is used to form a pressure-sensitive adhesive layer.

The pressure-sensitive adhesive composition for a touch panel of the present invention may be applied to a touch panel having the above-described structure. Specifically, the composition may be applied to the pressure-sensitive adhesive layer of a touch panel including a base and a pressure-sensitive adhesive layer attached to the base.

Specifically, the pressure-sensitive adhesive composition of the present invention has a resistance change ratio, which is defined by $[(R-R_i)/R_i] \times 100$ in Formula 1, of 10% or less, preferably 8% or less, which is described above. A specific method of measuring the resistance change ratio employs a method to be described in the following exemplary embodiment.

In still another aspect, a pressure-sensitive tape for a touch panel includes an acryl polymer compound including an acryl polymer and a thiol polymer derived from the acryl acryl monomer and a thiol compound, and has a peel strength with respect to a polycarbonate sheet of 1,900 g/25 mm or more when the tape is formed of a pressure-sensitive adhesive layer.

Figure 4:
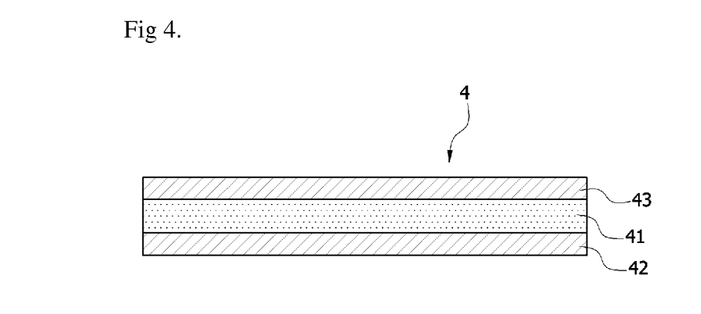
FIG. 4 shows a double-sided pressure-sensitive adhesive tape according to an exemplary embodiment of the present invention.

FIG. 4 is a double-sided pressure-sensitive adhesive tape according to one exemplary embodiment of the present invention, the tape further including the pressure-sensitive adhesive layer 41, and releasing films 42 and 43 formed on both surfaces of the pressure-sensitive adhesive layer 41.

When the double-sided pressure-sensitive adhesive tape includes the releasing film, peel strengths of a pressure-sensitive adhesive layer with respect to two sheets of the releasing films may be different from each other. For example, in the structure shown in FIG. 4, peel strength of the pressure-sensitive adhesive layer 41 with respect to one releasing film 43 may be higher than the peel strength of pressure-sensitive adhesive layer 41 with respect to the other releasing film 42. The double-sided pressure-sensitive adhesive tape having such a structure may be formed by suitably selecting the kind of releasing film, or controlling a cure degree of the pressure-sensitive adhesive layer 41.

The kind of releasing film of the present invention is not particularly limited, and thus various releasing films known in the art may be used without limitation, and the thickness of the releasing film may be controlled to approximately 5 to 150 μm.

In yet another aspect, a method of preparing a pressure-sensitive adhesive composition of the present invention may include initiating polymerization of a monomer mixture by inputting an initiator to the monomer mixture including an acryl monomer, and adding a thiol compound after the polymerization is initiated before the polymerization is terminated.

In the operation of inputting the thiol compound to a polymerization system after the polymerization is initiated before the polymerization is terminated, specifically, the thiol compound may be input between one minute after the polymerization of a monomer mixture is initiated and 15 minutes before the polymerization is terminated, or input between the time that the monomer mixture has a conversion rate of 5% and the time that the monomer mixture has a conversion rate of 95% of the final conversion rate. In addition, the time that the reaction is terminated means the time to reach a desired conversion rate. Effects according to this are as described above.

Details relating to the monomer and the thiol compound are as described above. In addition, the present invention is not limited to the kind and content of an initiator, and, for example, 0.01 to 1 part by weight of azobisisobutyronitrile (AIBN) may be used as an initiator.

In addition, a pressure-sensitive adhesive composition may be prepared by further blending a crosslinking agent and another additive. Details relating to the crosslinking agent and additive are as described above.

Moreover, in the operation of adding a thiol compound after the polymerization is initiated before the polymerization is terminated, the thiol compound is derived by adding 0.0001 to 5 parts by weight, preferably 0.005 to 0.5 parts by weight, and more preferably 0.01 to 0.1 parts by weight of the thiol compound with respect to 100 parts by weight of the monomer mixture, and thus performance of restraining resistance change of a conductor thin film may be enhanced.

The present invention is not particularly limited to a method of forming the pressure-sensitive adhesive layer and manufacturing a double-sided pressure-sensitive adhesive tape. For example, the double-sided pressure-sensitive adhesive tape may be manufactured by forming a pressure-sensitive adhesive layer by coating the pressure-sensitive adhesive composition of the present invention or a coating solution whose viscosity is controlled by diluting the composition in a suitable solvent on a releasing film, and curing the coated composition or coating solution, and laminating another releasing film. In addition, the coating is not necessarily performed on the releasing film, or may be performed on a base in another suitable process. Moreover, the curing process of the coated coating solution may be performed by drying the coated layer under suitable conditions, and when necessary, after or together with the drying process, an acryl-based resin included in the pressure-sensitive adhesive composition may be crosslinked using a multifunctional crosslinking agent by heating. However, the crosslinking process is not necessarily performed in the process of forming the pressure-sensitive adhesive layer, or may be performed when the double-sided pressure-sensitive adhesive tape is applied to a touch panel.

For example, when the double-sided pressure-sensitive adhesive tape is applied to a touch panel having the structure described above, the pressure-sensitive adhesive layer may be coated on a base or a conductor thin film formed on the base, and the acryl-based resin may be crosslinked through suitable crosslinking treatment.

The present invention provides a pressure-sensitive adhesive effectively inhibiting bubble generation and having high peel strength under severe conditions. When a pressure-sensitive adhesive layer is directly attached to a conductor thin film, a change in the resistance of the conductor thin film can be effectively inhibited, and thus a touch panel can be stably driven for a long time.

1, 2, 3: basic structure of the touch panel
11, 21, 31, 32, 41: pressure sensitive adhesive layer
23, 35: substrate
22, 33, 34: conductor thin film
12, 24, 36, 37: base
4: double-sided pressure-sensitive adhesive tape
42, 43: releasing film
10: PET film 20: ITO thin film
30: silver paste 40: pressure sensitive adhesive layer
51: releasing film 60: resistance measurer

DETAILED DESCRIPTION OF EXEMPLARY EMBODIMENTS

Hereinafter, the present invention will be described in detail with reference to Examples according to the present invention and Comparative Examples not according to the present invention, but the scope of the present invention is not limited to the following examples.

Physical properties in Examples were evaluated by the following methods:

1. Durability Test

A sample was prepared by attaching a hard coating surface of a polyethylene terephthalate (PET) film (thickness: 100 μm) having hard coatings formed on both surfaces to a polycarbonate sheet (thickness: 1 mm) by means of a pressure-sensitive adhesive layer, cutting the resulting product to a size of 50 mm (width)×100 mm (length), and putting the cut product in an autoclave at 60° C. under 5 atm for 30 minutes. Afterward, the sample was left at 80° C. for 240 hours, and then durability was evaluated.

The durability was evaluated by observing whether or not bubbles were generated and lift-off/peeling occurred when the sample was left under the above conditions, and specific measuring methods and criteria for evaluating respective properties are as follows:

<Criteria for Evaluating Bubble Generation>

O: When bubbles were not observed or it was observed that a small amount of bubbles having a diameter of 100 μm or less were dispersed at a pressure-sensitive adhesive interface through observation using an optical microscope X: When bubbles having a diameter of 100 μm or more, or groups of bubbles having a diameter of 100 μm or less were observed at a pressure-sensitive adhesive interface through observation using an optical microscope <Criteria for Evaluating Lift-Off/Peeling>

Figure 5:
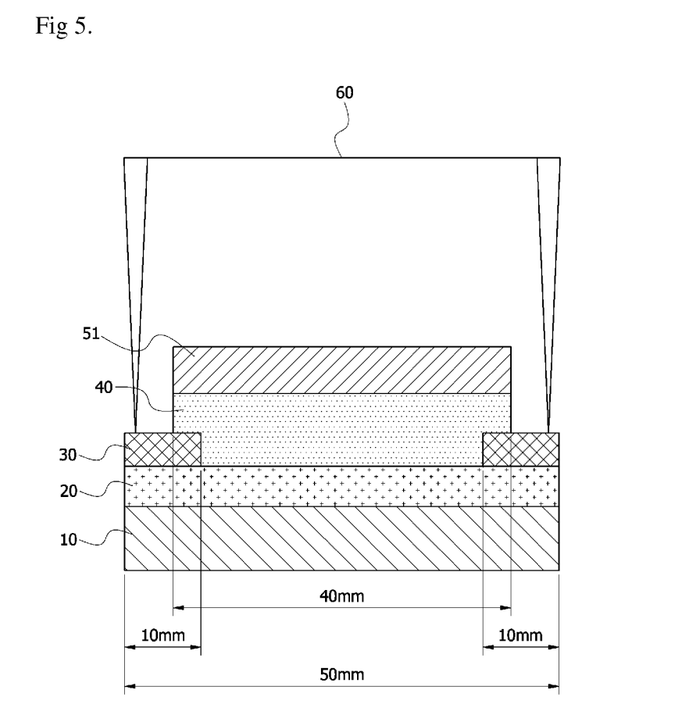
FIG. 5 illustrates a method of measuring a resistance change ratio according to the present invention.

O: When there was no lift-off/peeling at a pressure-sensitive adhesive interface X: When lift-off/peeling occurred at a pressure-sensitive adhesive interface 2. Resistance Change Ratio Test A resistance change ratio was measured by the method shown in FIG. 5. First, a PET film 10 (hereinafter, referred to as a "conductive PET" which is commercially available) having an ITO thin film 20 formed on one surface thereof, was cut into a size of 30 mm×50 mm (width×length). Subsequently, as shown in FIG. 5, a silver paste 30 was applied to both ends of the film to a width of 10 mm, and plasticized at 150° C. for 30 minutes. Afterward, a pressure-sensitive adhesive film having releasing films 51 attached to both surfaces thereof, as manufactured in Examples, was cut into a size of 30 mm×40 mm (width×length), the releasing film was removed from one surface of the pressure-sensitive adhesive film, and then a pressure-sensitive adhesive layer 40 was attached to the plasticized film by matching a center of the pressure-sensitive adhesive layer 40 with centers of the conductive PET 10. Then, an initial resistance $R_i$ was measured using a conventional resistance measurer 60. After measuring the initial resistance, a sample having the structure shown in FIG. 4 was left at 60° C. and 90% relative humidity for 240 hours, and a resistance (R) was measured using the measurer 60. Each value was put into Expression 1 to measure a resistance change ratio (P).

$$P=[(R-R_i)/R_i]\times 100 \qquad \text{[Expression 1]}$$

3. Peel Strength Test

Peel strength was measured by preparing a double-sided pressure-sensitive adhesive tape previously manufactured to have a width of 1 inch and attaching the tape on a polycarbonate-stacked structure as an adherent by rolling the tape twice using a 2-kg roller. 30 minutes after the attachment, a 180-degree peel strength (peel rate: 300 mm/min) was measured at room temperature using a texture analyzer. The measurement was performed three times per each sample, and an average value was listed in Table 2.

4. Evaluation of Weight Average Molecular Weight and Polydispersity Index

Weight average molecular weight and polydispersity index of an acryl polymer were measured using GPC under the following conditions. To prepare a calibration curve, measurement results were converted using standard polystyrene produced by Agilent System.

<Conditions for Measuring Weight Average Molecular Weight>

Measurer: Agilent GPC (Agilent 1200 series, USA)
Column: Two PL Mixed Bs connected
Column Temperature: 40° C.
Soluent: Tetrahydrofuran
Flow Rate: 1.0 mL/min
Concentration: Up to Approximately 2 mg/mL (100 μL injection)

Preparation of Acryl Polymer Compounds

Preparation Example 1: Preparation of Acryl Polymer Compound A 58 parts by weight of n-butyl acrylate (n-BA), 40 parts by weight of methyl acrylate (MA) and 2 parts by weight of hydroxyethyl acrylate (HEA) were put into a 1 L reactor in which a cooling apparatus was equipped to reflux a nitrogen gas and facilitate temperature control. Subsequently, 150 parts by weight of ethylacetate (EAc) was added as a solvent, and the reactor was purged with nitrogen gas for 60 minutes to remove oxygen. Temperature was maintained at 60° C., and 0.04 parts by weight of azobisisobutyronitrile (AIBN) was added as a reaction initiator to initiate the reaction. Four hours after the reaction was initiated, 0.01 parts by weight of n-dodecanthiol was added as a thiol compound. After additional reaction for 1 hour, a reaction product was diluted with EAc, thereby obtaining an acryl polymer compound A having a solid content of 30 wt %, a weight average molecular weight of 700,000, and a polydispersity index ($M_w/M_n$) of 5.2.

Preparation Example 2: Preparation of Acryl Polymer Compound B

An acryl polymer compound B having a solid content of 30 wt %, a weight average molecular weight of 710,000 and a polydispersity index of 5.8 was prepared by the same method as described in Preparation Example 1, except that 0.02 parts by weight of n-dodecanthiol was added as a thiol compound.

Preparation Example 3: Preparation of Acryl Polymer Compound C

An acryl polymer compound C having a solid content of 30 wt %, a weight average molecular weight of 750,000 and a polydispersity index of 5.7 was prepared by the same method as described in Preparation Example 1, except that 0.04 parts by weight of n-dodecanthiol was added as a thiol compound.

Preparation Example 4: Preparation of Acryl Polymer Compound D

An acryl polymer compound D having a solid content of 30 wt %, a weight average molecular weight of 730,000 and a polydispersity index of 6.9 was prepared by the same method as described in Preparation Example 1, except that 0.1 parts by weight of n-dodecanthiol was added as a thiol compound.

Preparation Example 5: Preparation of Acryl Polymer Compound E

An acryl polymer compound E having a solid content of 30 wt %, a weight average molecular weight of 630,000 and a polydispersity index of 5.5 was prepared by the same method as described in Preparation Example 1, except that 0.04 parts by weight of n-dodecanthiol was added as a thiol compound 2 hours after the reaction was initiated.

Preparation Example 6: Preparation of Acryl Polymer Compound F

An acryl polymer compound F having a solid content of 30 wt %, a weight average molecular weight of 690,000 and a polydispersity index of 5.1 was prepared by the same method as described in Preparation Example 1, except that n-octyl mercaptan was used as a thiol compound.

Preparation Example 7: Preparation of Acryl Polymer Compound G

An acryl polymer compound G having a solid content of 30 wt %, a weight average molecular weight of 710,000 and a polydispersity index of 5.3 was prepared by the same method as described in Preparation Example 1, except that n-nonyl mercaptan was used as a thiol compound.

Preparation Example 8: Preparation of Acryl Polymer Compound H

An acryl polymer compound H having a solid content of 30 wt %, a weight average molecular weight of 700,000 and a polydispersity index of 2.6 was prepared by the same method as described in Preparation Example 1, except that 0.04 parts by weight of n-dodecanthiol was added as a thiol compound together with a monomer.

Preparation Example 9: Preparation of Acryl Polymer Compound I

An acryl polymer compound I having a solid content of 30 wt %, a weight average molecular weight of 730,000 and a polydispersity index of 5.9 was prepared by the same method as described in Preparation Example 1, except that a thiol compound was not added.

Manufacture of Double-Sided Pressure-Sensitive Adhesive Tape

Example 1

A pressure-sensitive adhesive composition was prepared by uniformly mixing 0.3 parts by weight of an isocyanate crosslinking agent (toluene diisocyanate (TDI); solid) with respect to 100 parts by weight of an acryl polymer compound obtained in Preparation Example 1 used as a pressure-sensitive adhesive resin (solid).

A transparent pressure-sensitive adhesive layer having a coating thickness of 50 μm was formed by coating the pressure-sensitive adhesive solution on a releasing-treated surface of a PET film (thickness: 50 μm) and leaving the coated product at 120° C. for 3 minutes. Subsequently, a pressure-sensitive adhesive film was prepared by laminating the releasing-treated surface of the PET film having a thickness of 50 μm on the other surface of the pressure-sensitive adhesive layer.

Example 2

A double-sided pressure-sensitive adhesive tape was prepared by the same method as described in Example 1, except that the acryl polymer compound B in Preparation Example 2 was used.

Example 3

A double-sided pressure-sensitive adhesive tape was prepared by the same method as described in Example 1, except that acryl polymer compound C in Preparation Example 3 was used.

Example 4

A double-sided pressure-sensitive adhesive tape was prepared by the same method as described in Example 1, except that acryl polymer compound D in Preparation Example 4 was used.

Example 5

A double-sided pressure-sensitive adhesive tape was prepared by the same method as described in Example 1, except that acryl polymer compound E in Preparation Example 5 was used.

Example 6

A double-sided pressure-sensitive adhesive tape was prepared by the same method as described in Example 1, except that acryl polymer compound F in Preparation Example 6 was used.

Example 7

A double-sided pressure-sensitive adhesive tape was prepared by the same method as described in Example 1, except that acryl polymer compound G in Preparation Example 7 was used.

Comparative Example 1

A double-sided pressure-sensitive adhesive tape was prepared by the same method as described in Example 1, except that acryl polymer compound H in Preparation Example 8 was used.

Comparative Example 2

A double-sided pressure-sensitive adhesive tape was prepared by the same method as described in Example 1, except that acryl polymer compound I in Preparation Example 9 was used.

Compositions in Examples and Comparative Examples are shown in Table 1.

TABLE 1

| | | Example | | | | | | | Comparative Example | |
|---|---|---|---|---|---|---|---|---|---|---|
| | | 1 | 2 | 3 | 4 | 5 | 6 | 7 | 1 | 2 |
| Acryl Polymer (Parts by Weight) | BA | 58 | 58 | 58 | 58 | 58 | 58 | 58 | 58 | 58 |
| | MA | 40 | 40 | 40 | 40 | 40 | 40 | 40 | 40 | 40 |
| | HEA | 2 | 2 | 2 | 2 | 2 | 2 | 2 | 2 | 2 |
| Initiator | AIBN (Parts by Weight) | 0.04 | 0.04 | 0.04 | 0.04 | 0.04 | 0.04 | 0.04 | 0.04 | 0.04 |
| Thiol Compound (Parts by Weight) | n-dodecanthiol | 0.01 | 0.02 | 0.04 | 0.1 | 0.04 | — | — | 0.04 | 0 |
| | n-octyl mercaptan | — | — | — | — | — | 0.01 | — | — | — |
| | n-nonyl mercaptan | — | — | — | — | — | — | 0.01 | — | — |
| | Input Time | 4 hrs | 4 hrs | 4 hrs | 4 hrs | 2 hrs | 4 hrs | 4 hrs | Input with monomer | — |
| Crosslinking Agent | TDI (Parts by Weight) | 0.3 | 0.3 | 0.3 | 0.3 | 0.3 | 0.3 | 0.3 | 0.3 | 0.3 |

BA: n-butyl acrylate
MA: methylacrylate
HEA: hydroxyethylacrylate
AIBN: azobisisobutyronitrile
TDI: toluene diisocyanate Conversion rates, weight average molecular weights, polydispersity indexes, and results of the durability and resistance change ratio tests, which were measured in Examples and Comparative Examples, are shown in Table 2.

TABLE 2

| | | Example | | | | | | | Comparative Example | |
|---|---|---|---|---|---|---|---|---|---|---|
| | | 1 | 2 | 3 | 4 | 5 | 6 | 7 | 1 | 2 |
| Acryl Polymer Compound | $M_w$(10,000) | 70 | 71 | 75 | 73 | 63 | 69 | 71 | 70 | 73 |
| | Polydispersity Index | 5.2 | 5.8 | 5.7 | 6.9 | 5.5 | 5.1 | 5.3 | 2.6 | 5.9 |
| Inhibition of Bubble Generation | | ○ | ○ | ○ | ○ | ○ | ○ | ○ | ○ | ○ |
| Evaluation of Lift-off/Peeling | | ○ | ○ | ○ | ○ | ○ | ○ | ○ | ○ | ○ |
| Peel Strength(g/25 mm) Adherent PC Sheet | | 2400 | 2380 | 2450 | 2460 | 2500 | 2430 | 2410 | 1820 | 2420 |
| Resistance Change Ratio(%) | | 7 | 6 | 5 | 5 | 7 | 7 | 7 | 5 | 18 |

$M_w$: weight average molecular weight

As shown in Table 2, the pressure-sensitive adhesive layer of the present invention satisfies all of various properties required for a touch panel, and particularly, the pressure-sensitive adhesive having an excellent resistance change ratio with respect to ITO and a double-sided pressure-sensitive adhesive tape using the same can be manufactured.

What is claimed is:

1. A touch panel, comprising:
a base wherein an indium tin oxide (ITO) film is formed on at least one surface of the base; and
a pressure-sensitive adhesive layer directly attached to the indium tin oxide (ITO) film on the base, which comprises an acryl polymer compound containing an acryl polymer derived from an acryl monomer and a thiol polymer derived from an acryl monomer and a thiol compound,
wherein the pressure-sensitive adhesive layer completely covers the ITO film,
wherein the acryl polymer compound has a polydispersity index from 5.0 to 6.9,
wherein the acryl polymer compound has a weight average molecular weight of 630,000 to 2,500,000,
wherein the thiol compound is at least one selected from the group consisting of n-dodecanthiol, t-butyl mercaptan, n-butyl mercaptan, 1-octadecanthiol, trimethylol propane tris(3-mercaptothiol), pentaerythritol tetrakis (3-mercaptopropionate) and glycol dimercaptoacetate,
wherein the pressure-sensitive adhesive layer has a resistance change ratio of the indium tin oxide (ITO) film of 7% or less, and wherein the pressure-sensitive adhesive layer has a peel strength with respect to a polycarbonate sheet of 2,400 g/25 mm or more.

2. The touch panel according to claim 1, wherein the acryl polymer comprises a (meth)acrylic acid ester-based monomer in a polymerized form.

3. The touch panel according to claim 1, wherein the pressure-sensitive adhesive layer further comprises a multifunctional crosslinking agent crosslinking the acryl polymer compound.

4. A pressure-sensitive adhesive composition for a touch panel including a base wherein an indium tin oxide (ITO) film is formed on at least one surface of the base; and a pressure-sensitive adhesive layer directly attached to the indium tin oxide (ITO) film on the base,
wherein the pressure-sensitive adhesive layer completely covers the ITO film, and the pressure-sensitive adhesive layer is formed from the pressure sensitive adhesive composition,
wherein the pressure-sensitive adhesive composition comprises an acryl polymer compound containing an acryl polymer derived from an acryl monomer and a thiol polymer derived from an acryl monomer and a thiol compound,
wherein the acryl polymer compound has a polydispersity index from 5.0 to 6.9,
wherein the acryl polymer compound has a weight average molecular weight of 630,000 to 2,500,000,
wherein the thiol compound is at least one selected from the group consisting of n-dodecanthiol, t-butyl mercaptan, n-butyl mercaptan, 1-octadecanthiol, trimethylol propane tris(3-mercaptothiol), pentaerythritol tetrakis (3-mercaptopropionate) and glycol dimercaptoacetate,
wherein when a pressure-sensitive adhesive layer is formed by using the pressure-sensitive adhesive composition, the layer has a peel strength with respect to a polycarbonate sheet of 2,400 g/25 mm or more, and
wherein the pressure-sensitive adhesive layer has a resistance change ratio of the indium tin oxide (ITO) film of 7% or less.

5. A double-sided pressure-sensitive adhesive tape for a touch panel, comprising a pressure-sensitive adhesive layer which is a cured product of the composition according to claim 4.

* * * * *